Feb. 23, 1960 T. A. SINDELAR 2,925,619
APPARATUS FOR PRESSING CONSUMABLE ELECTRODE BILLETS
Filed March 15, 1956 7 Sheets-Sheet 5

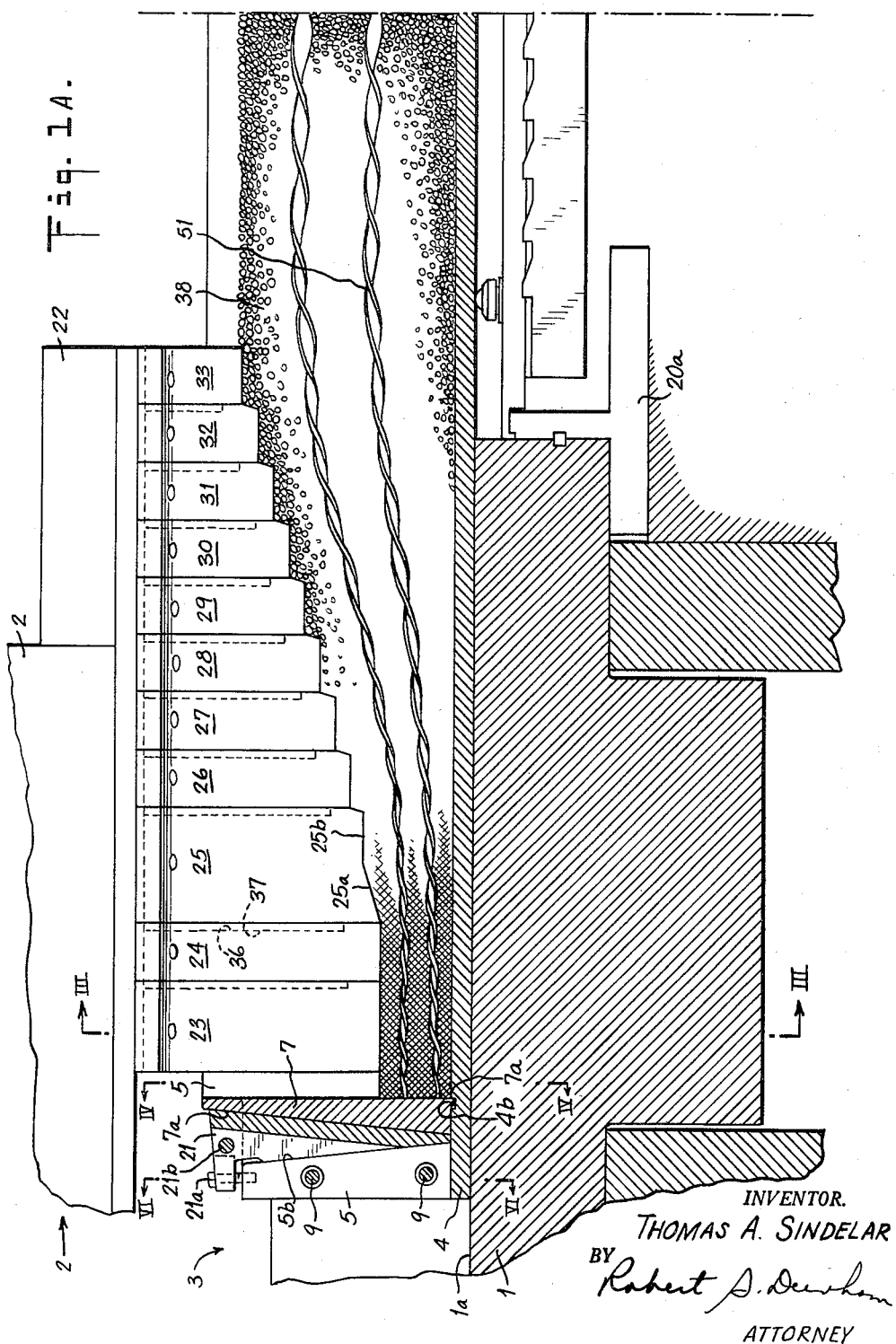

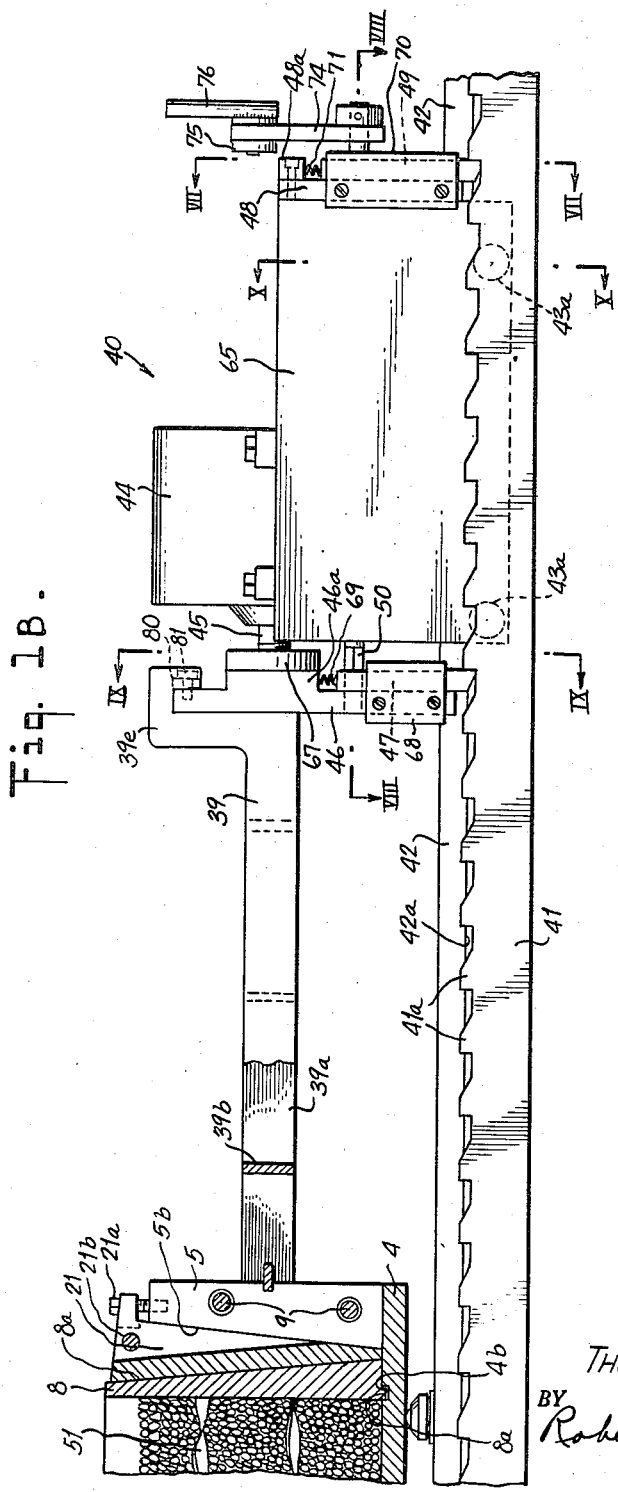

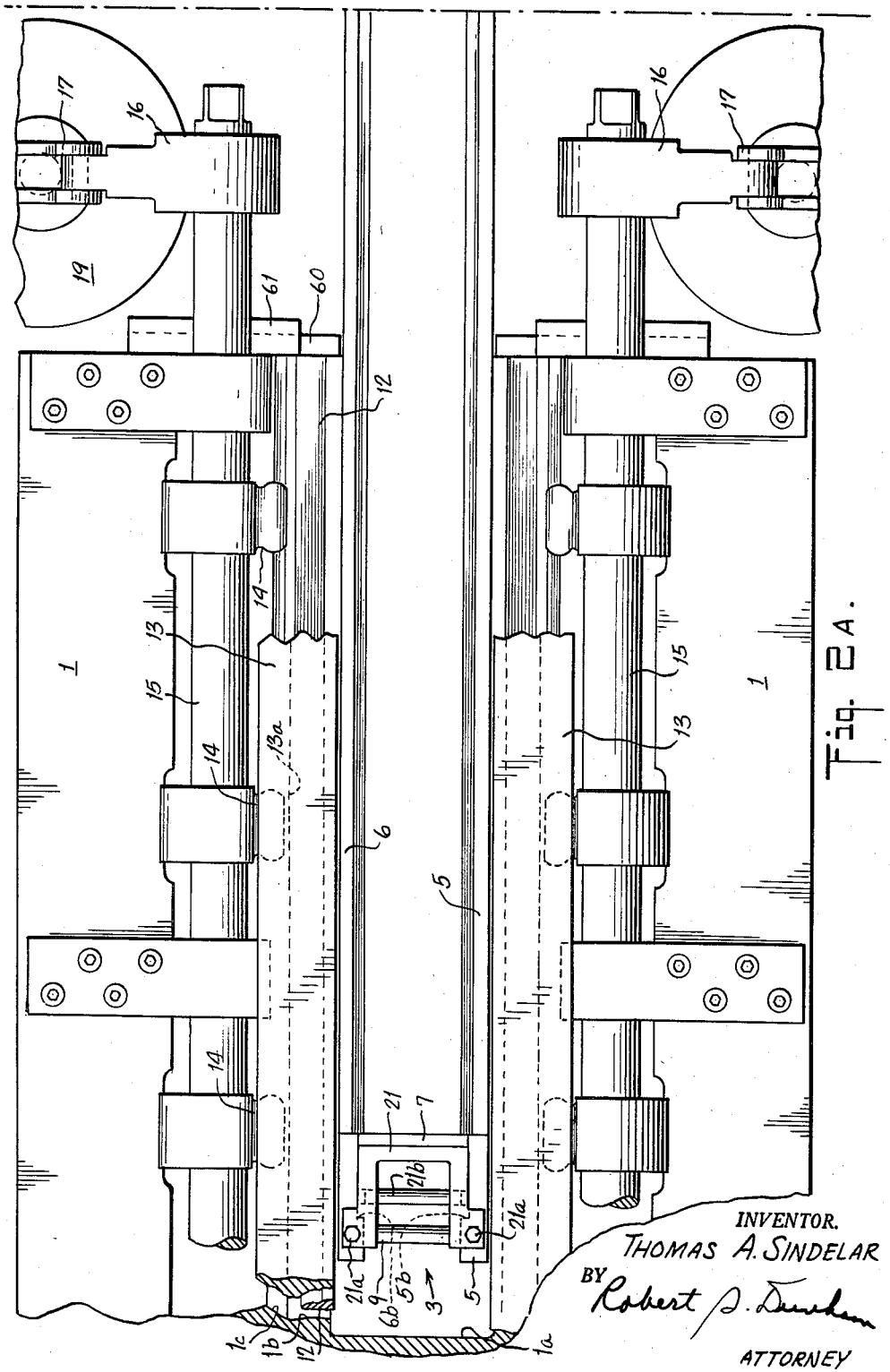

INVENTOR.
THOMAS A. SINDELAR
BY *Robert A. Dunham*
ATTORNEY

Feb. 23, 1960 T. A. SINDELAR 2,925,619
APPARATUS FOR PRESSING CONSUMABLE ELECTRODE BILLETS
Filed March 15, 1956 7 Sheets-Sheet 6
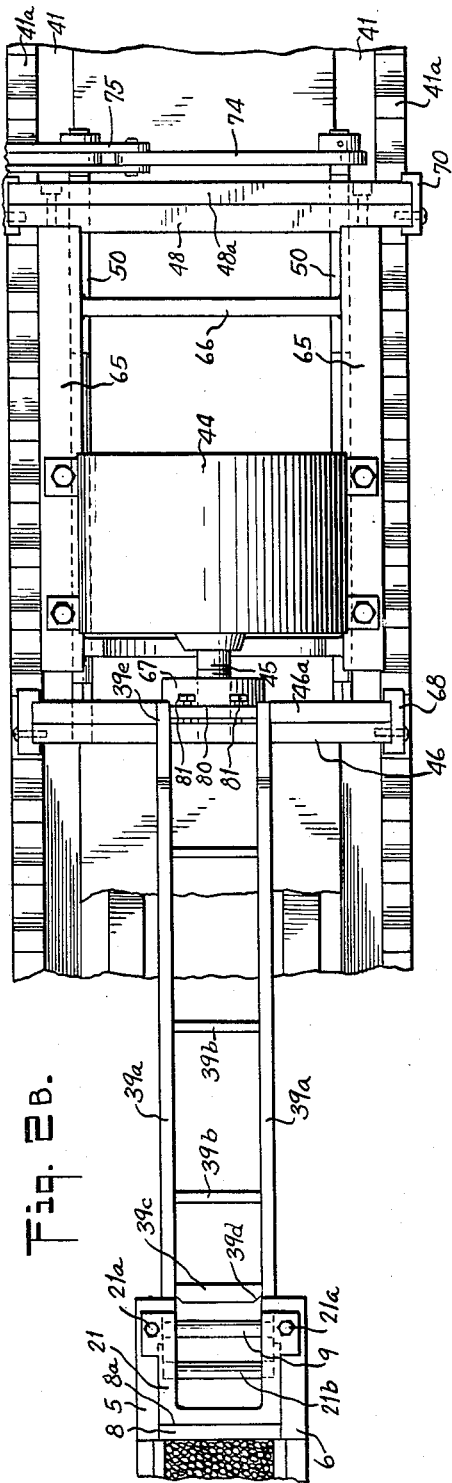
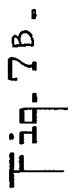
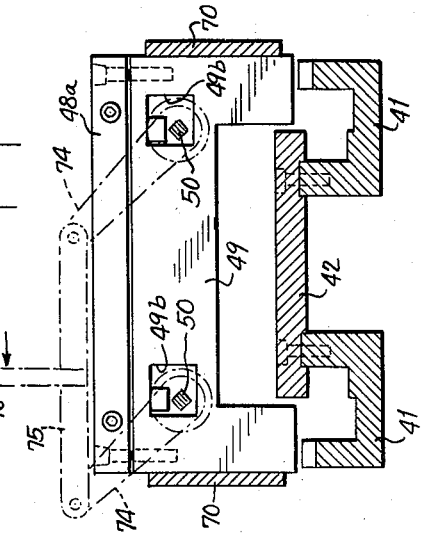
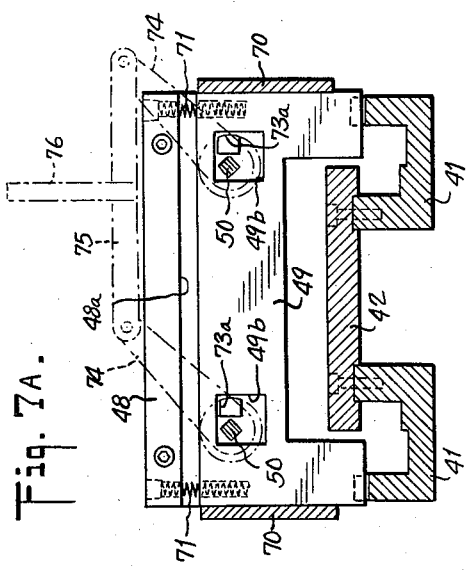
INVENTOR.
THOMAS A. SINDELAR
BY Robert A. Dunham
ATTORNEY

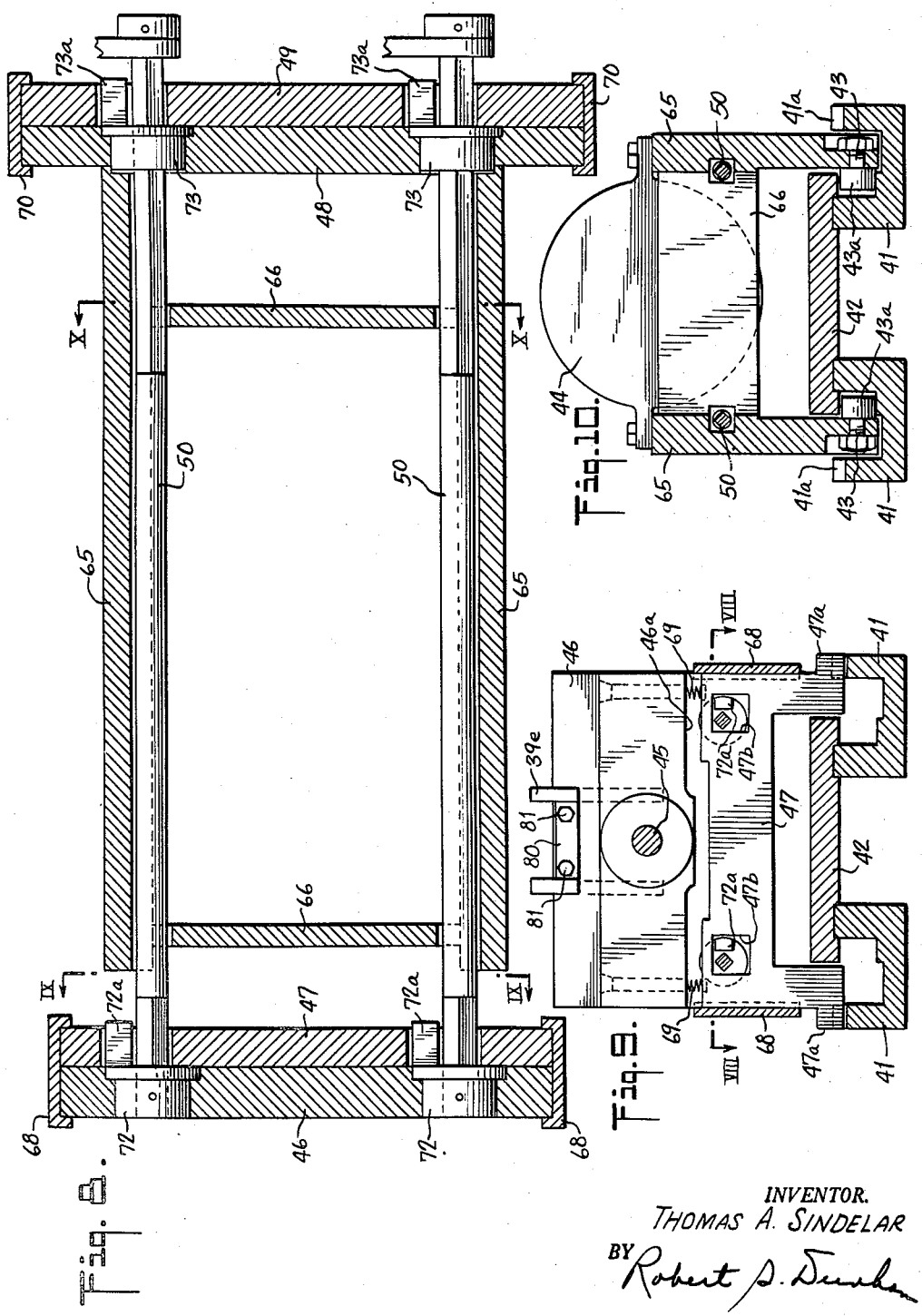

United States Patent Office 2,925,619
Patented Feb. 23, 1960

2,925,619

APPARATUS FOR PRESSING CONSUMABLE ELECTRODE BILLETS

Thomas A. Sindelar, Cleveland, Ohio, assignor to Republic Steel Corporation, Cleveland, Ohio, a corporation of New Jersey Application March 15, 1956, Serial No. 571,810

5 Claims. (Cl. 18—16)

This invention relates to consumable electrode billets adapted for use in electric furnaces, where such billets are melted to form ingots, and to apparatus for producing such billets. The invention is particularly concerned with metals which may be melted only with great difficulty, for example, titanium, zirconium, and the like, although in its broader aspects, it is applicable to other metals.

There is disclosed in the copending application of Robert J. Garmy, Serial No. 391,549, filed November 12, 1953, entitled "Method and Apparatus for Forming Ingots," now U.S. Patent No. 2,800,519, issued July 23, 1957, an electric furnace in which the principal feed of metal into the furnace is in the form of relatively finely divided material, such as sponge or scrap, the electrodes being formed of graphite or tungsten, and not being consumed in the normal operation of the furnace, although it is there suggested that the electrodes may be formed of titanium. The electrodes described in the present application are, on the other hand, intended to provide the principal feed of metal to a furnace, although they may of course be used in cooperation with another feed such as that disclosed in the Garmy application.

The titanium available from present commercial reducing processes is typically in the form of sponge, i.e., more or less porous particles ranging in size from a fine dust to lumps several inches in diameter. This sponge is difficult to handle particularly with respect to supplying it to a furnace where it is to be formed into an ingot. The handling difficulties arise: (1) from the high chemical reactivity of the titanium at elevated temperatures; (2) from the gases which are entrained in the porous sponge, and which may react with the metal when heated; and (3) the fine dust of the sponge, which is difficult to confine and is highly abrasive.

It is also desirable to use titanium scrap for producing ingots, in order that the scrap may be remelted as a final step in salvaging the same. This scrap is available in a wide variety of shapes and sizes, some of which are just as difficult to handle as sponge.

An object is to provide improved apparatus for forming an improved compressed electrode billet of difficultly meltable metal formed from sponge and/or scrap of that metal. A further object is to provide an improved press for compressing the sponge and/or scrap.

Another object is to provide an improved apparatus in which the billet is compressed in a stepwise fashion, and improved means for advancing the billet stepwise through the apparatus.

The foregoing objects of the invention are attained in the apparatus described herein.

The apparatus includes a press comprising a die block having a channel with a novel liner in which the material to be compressed is placed, and in which the electrode is formed. The channel liner includes releasable wedging arrangements at its sides and ends. It may, if desired, also include an auxiliary liner which is placed within the main channel liner, and is in the form of a sheet of the metal being compressed.

The press also includes a novel punch structure which is of a sectional stepped formation. Each portion of the sponge is engaged successively by the several steps, and each successive step in the punch is adapted to compress the sponge or scrap by an amount slightly greater than the previous step.

The press also includes novel advancing mechanism for moving the filled channel liner under the punch of the press in steps corresponding in length to the length of the steps on the punch.

Other objects and advantages of the invention will become apparent from a consideration of the following description and claims, taken together with the accompanying drawings.

In the drawings:

Figs. 1A and 1B, taken together, provide a vertical sectional view through a press for producing an electrode in accordance with the invention and the apparatus for feeding the electrode forming material through the press;

Figs. 2A and 2B together form a plan view of the die block of the press of Figs. 1A and 1B, and the advancing mechanism for feeding material into the press;

Fig. 7A is a cross-sectional view taken on the line VII—VII of Fig. 1B;

Fig. 7B is a cross-sectional view similar to Fig. 7A, showing the parts in different positions;

Fig. 8 is a cross-sectional view, on an enlarged scale, taken on the line VIII—VIII of Figs. 1B and 9;

Fig. 9 is a cross-sectional view, taken on the line IX—IX of Figs. 1B and 8; and Fig. 10 is a cross-sectional view, taken on the line X—X of Figs. 1B and 8.

Figure 3:
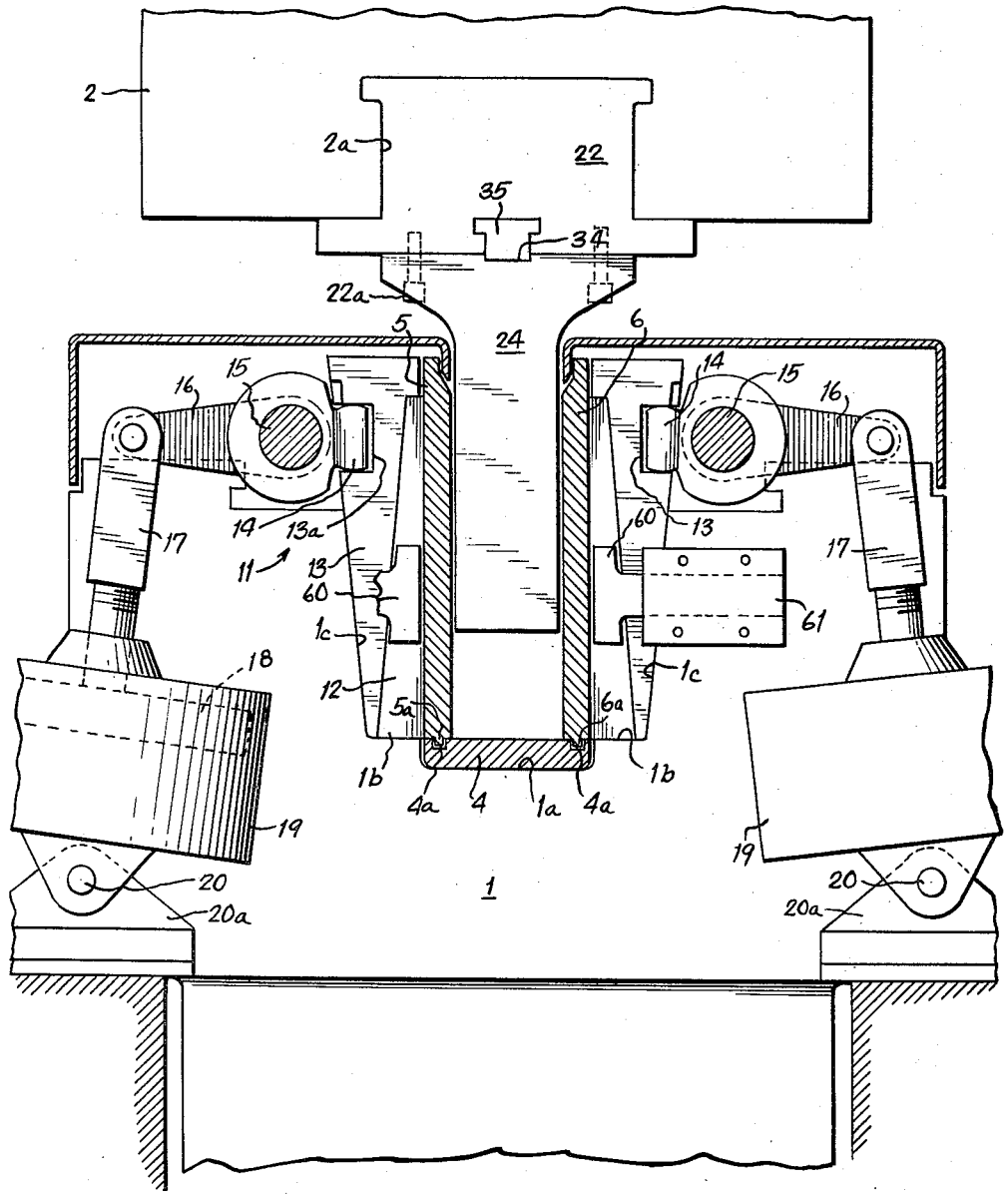
Fig. 3 is a somewhat diagrammatic cross-sectional view taken on the line III—III of Fig. 1A illustrating particularly the punch structure and the releasable wedging mechanism at the sides of the channel liner.

Referring to the drawings, there is shown a press comprising a bed supporting a die block 1 and a ram generally indicated at 2 and movable downwardly toward the die block 1 by any suitable press actuating mechanism of conventional type (not shown). The block 1 has formed in its upper surface a channel 1a. In this channel there is received a channel liner structure generally indicated by the reference numeral 3. The channel liner structure includes a bottom plate 4, side plates 5 and 6 (Fig. 3) and end plates 7 and 8. As shown in Fig. 3, the top surface of the bottom plate 4 is provided with grooves 4a to receive ridges 5a, 6a on the bottoms of the side plates 5 and 6. The grooves 4a are made somewhat wider than the ridges 5a, 6a, to allow lateral movement of the side plates 5 and 6 with respect to the bottom plate 4, so that the electrode may expand laterally as it is compressed.

The bottom plate 4 is provided with grooves 4b (Figs. 1A and 1B) to receive ridges 7a, 8a, formed on the lower surfaces of the end plates 7 and 8. The grooves 4b are made somewhat wider than the ridges 7a, 8a so that the end plates 7 and 8 may move to accommodate longitudinal expansion of the electrode during compression.

Figure 6:
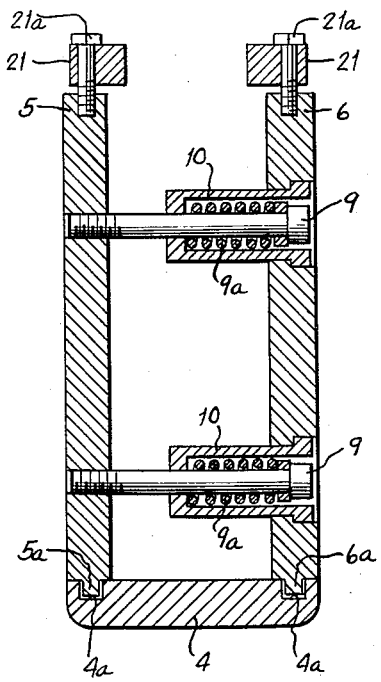
Fig. 6 is a cross-sectional view taken on the line VI—VI of Fig. 1A, showing a detail of the channel liner construction.

The side plates 5 and 6 project beyond the end plates 7 and 8, and the projecting end portions are yieldably connected as illustrated in Fig. 6. As there shown, two bolts 9 are threaded into the side plate 5 and extend into openings in the side plate 6. Spring retainer cylinders 10 are mounted in these openings, and springs 9a are retained in the retainer cylinders 10 between the bottoms thereof and washers underlying the heads of the bolts 9. These springs bias the plates 5 and 6 for movement toward one another, and thereby to take up the space between the ridges 5a, 6a and the inner sides of the grooves 4a.

The end members 7 and 8 of the channel liner 3 are provided on their outer faces with tapering outwardly facing wedging surfaces 7a, 8a, cooperating with vertically movable wedge members 21. Inwardly facing wedging surfaces 5b, 6b are provided on the side plates 5 and 6 adjacent their ends. Removable wedge members 21 may be inserted between the wedge surface 5b, 6b and the end plates 7 and 8 to hold the end plates tightly in place during the pressing operation. When in place, the wedge members 21 may be fastened down by any suitable means, as bolts 21a. A rod 21b spans each of the wedge members 21, and serves as a handle for moving the wedge member.

The channel 1a, as best seen in Fig. 3, comprises a deep central portion slightly wider than the bottom plate 4 of the channel liner, so that the plate 4 is slidable through that central portion; shallower portions or shelves 1b at each side of the central portion; and upwardly extending side walls 1c, which slant outwardly toward the top, so that the channel as a whole is wider at the top than at the bottom.

Each of the side plates 5 and 6 is held against outward movement by a releasable wedging mechanism 11 mounted on the die block 1 and best illustrated in Fig. 3. Each of the wedging mechanisms 11 comprises a vertically tapered wedge plate 12, which is thinnest at the top, and a cooperating vertically tapered wedge plate 13, which is thinnest at the bottom. Each of the plates 12 has one vertical side which engages the outer surface of one of the side plates 5 and 6. The plates 12 and 13, when in their full wedging positions, as shown in Fig. 3, rest on the shelves 1b and fill the space between the side walls 1c and the side plates 5 and 6. The wedge plates 13 are provided at several spaced locations near the upper edge of their outside surfaces, with recesses 13a which receive ball cranks 14 fixed on a shaft 15 for rotation therewith. Also fixed on each end (only one end is shown in the drawings) of each of the crank shafts 15, is a crank arm 16 connected by a piston rod 17 to a piston 18 in an actuating cylinder 19. The cylinders 19 are pivotally mounted on pins 20 supported by brackets 20a mounted on the bed of the press.

T-shaped guide plates 60 (Figs. 2A and 3) are held in place on the ends of die block 1 by means of retainer plates 61 having channels on their inner surfaces to receive the stems of the guide plates 60. The plates 60 prevent endwise movement of the inner wedge plates 12.

The ram 2 is provided with a central keyway 2a (Fig. 3) in which is received a beam or punch adapter 22 on which is mounted, by means of bolts 22a, a plurality of punch sections numbered respectively from 23 to 33.

Each of the punch sections 23 to 33 has a channel 34 cut in its upper surface to receive a key 35 carried by the beam 22. Each of the punch sections 23 to 33 also has a channel 36 formed in its right-hand surface as viewed in Fig. 1 to receive a projecting ridge or key 37 on the next adjacent die section, so that all the punch sections are held in accurate vertical and horizontal alignment by these keys and channels.

The channel liner, with a load 38 of sponge or scrap of a metal such as titanium is advanced from right to left as it appears in Fig. 1A. The advancing mechanism comprises a driving rod 39 abutting against one end of the channel liner and having its opposite end attached to a driving motor mechanism which is termed a "grasshopper" and is generally indicated by the reference numeral 40.

The rod 39 comprises a pair of spaced side plates 39a connected by cross-bars 39b. At its front end, the rod 39 carries a horizontally extending bar 39c having a projecting nose 39d adapted to extend between the ends of the channel side plates 5 and 6 to guide the rod 39 laterally.

*Step-by-step driving mechanism—Figs. 1B, 2B, 7A, 7B, 8, 9 and 10*

The driving mechanism includes a carriage 40 which rides along a pair of tracks 41, each of a generally channel shaped cross-section, with the channels opening upwardly. The inner flanges of the two channel shaped tracks 41 are connected by a spacer plate 42 which maintains the tracks 41 in a parallel relation. The outer flanges of the tracks 41 are provided on their upper surfaces with ratchet teeth 41a. These teeth are vertical on their left-hand side as viewed in Fig. 1B and sloping on their right-hand side.

The carriage 40 has a pair of side plates 65 connected by a pair of cross plates 66. Fixed on the lower sides of plates 65, near the ends, are arbors 43 (Fig. 10), on which are journaled rollers 43a which run on the tracks 41 and under flanges formed by the margins of spacer plate 42. Supported on the top of the carriage is a cylinder 44 which may be either hydraulic or pneumatic and within which moves a piston (not shown) driving a piston rod 45. The piston rod 45 has its outer end connected to an advancer plate 46 by suitable mechanism such as a coupling 67. The right-hand end of driving rod 39 is provided with a hooked extension 39e, adapted to engage the top of the advancer plate 46. A cross-bar 80 connects the ends of the side plates at the end of extension 39e. A pair of bolts 81 are threaded through the cross-bar 80 and engage the face of the advancer plate 46. Attached to the advancer plate 46 at either side thereof are a pair of channel shaped guide members 68. On the back of the advancer plate 46 and betweeen the guide plates 68, there is mounted a pawl plate 47 which spans the rails 41 and is provided at its lower end with pawl projections 47a which ride on the teeth 41a of the respective tracks 41. The advancer plate 46 includes a rearwardly extending projection 46a above the pawl plate 47. A plurality of springs 69 are retained betweeen the projection 46a and the pawl plate 47, and bias the pawl plate 47 downwardly, tending to hold it in engagement with the tracks 41.

On the opposite end of the carriage from the advancer plate 46 there is mounted a transverse plate 48. A pair of channel shaped guide plates 70 are mounted on the outer sides of the transverse plate 48. A second pawl plate 49 is received between the guide plates 70. The guide plate 48 is provided with a rearwardly extending projection 48a (see Fig. 1B). A plurality of springs 71 are retained between the projection 48a and the pawl plate 49 and bias it downwardly into engagement with the teeth 41a on the tracks 41.

A pair of guide rods 50 extend longitudinally of the carriage along recesses in the side plates 65. The forward ends of the guide rods 50 are fixed to hubs 73 journaled for rotation in the advancer plate 46. The rearward ends of the guide rods 50 are squared and are slidably mounted in hubs 73 journaled in the transverse plate 48. The guide rods 50 pass freely through square openings 47b provided in the pawl plate 47 and similar openings 49b provided in the pawl plate 49. The hubs 72 are provided with rearwardly extending projections 72a and the hubs 73 have similar projections 73a. With the parts in the positions shown in Fig. 7A, the projections 72a and 73a are free of the sides of the openings 47b and 49b. The pawl plates 47 and 49 are then biased downwardly to their respective pawl engaging positions. These are the positions of the parts during the advancing movement of the step-by-step motor mechanism. As the piston rod 45 is driven to the left by cylinder 44, the advancer plate 46 is moved one notch to the left along the tracks 41, springs 69 then permitting the pawl plate 47 to rise so that the pawls 47a may slide over the ratchet teeth 41a. On the return stroke of the piston rod and cylinder, the advancer plate remains stationary while the carriage moves forward one notch, the springs 71 then permitting the pawl plate 49 to rise.

When the carriage reaches the end of its forward travel, it is desired to lift both the pawl plates so that the carriage may be returned to its extreme right-hand position. This lifting of the pawl plates is accomplished by rotating the shafts 50 from the position shown in Fig. 7A to that shown in Fig. 7B, whereupon projections 72a and 73a lift the pawl plates 47 and 49 free of the ratchet teeth 41e. This rotation of the shafts 50 is accomplished by crank arms 74 fixed on the guide rods 50 and connected at their outer ends by a link 75, having a handle 76 attached to its center.

Operation

In forming an electrode by the use of the apparatus described, the channel liner is first assembled as illustrated in the drawings and the space within it is then filled with a suitable mixture of sponge and/or scrap metal, for example, titanium. The particular percentage of scrap employed together with the sponge depends more upon the size and configuration of the scrap particles than on any other factor. If the scrap particles approximate the sponge particles in size and density, then it is possible to use 100% scrap. It is, of course, possible to use 100% sponge. At present, a mixture containing not more than 30% scrap is preferred, since it results in an electrode of more uniform density than is the case with higher scrap percentages.

It is presently preferred to fill the channel liner about one-third full of the charge mixture and then to insert reinforcements in the form of ribbons 51 of the same material from which the sponge is formed. The filling then proceeds until the channel liner is about two-thirds full, whereupon another set of reinforcement ribbons 51 is inserted. These reinforcing ribbons may in many cases be omitted, but they contribute substantially to the strength of the final product and it is greatly preferred to use them. The filling of the channel liner proceeds, after the last reinforcements are inserted, until the level of the charge mixture is an inch or two below the top of the channel liner.

The channel liner is then advanced under the ram 2 until the inside of the end plate is aligned with the die section 24. The die section 23 is at this time removed from the ram. The wedging mechanisms 11 are operated to tighten the channel liner in the channel. The ram is then brought down to substantially the position illustrated in Fig. 1A, compressing the charge material under it in varying degrees, depending upon the length of the particular die section which engages the charge. The greatest compression is produced under the section 24. This die section completes the compression of the end portion of the charge and the other portions of the charge engaged by the various die sections are compressed in corresponding amounts.

After the compressing stroke of the ram 2, the ram is lifted, the wedges are released and the channel liner is advanced the length of one of die sections 26 to 33. The wedges are again tightened and the ram is brought down on another compressing stroke. After the second compressing stroke, the die section 23 is added just ahead of the die section 24 in the position shown in Fig. 1A. The channel liner 3 is then advanced by an amount equal to the length of one of the punch sections 26 to 33, and the ram is brought down again.

Note that the punch section 25 is twice as long in the direction of the channel liner movement as the other die sections and that for the first half of its length it has a tapered lower end, as shown at 25a in Fig. 1A. The purpose of this taper is to prevent the formation of a line of weakness in the upper surface of the billet as it approaches its final stages of compression. For the second half of its length, the bottom end of the punch section 25 is flat, as shown at 25b, like the bottoms of all the other punch sections.

By virtue of this construction of section 25, the final compressive step, which is the one requiring the greatest energy, is completed in two strokes of the ram, rather than in one.

The added punch section 23 is one and one-half times the length of the advancing steps of the liner and so overlaps the "joints" between the portions of the billet which are compressed together. The use of the punch section 23 makes the billet homogeneous across those joints, and also inhibits any tendency of the billet to "curl" upward at the joints after it passes out from under the punch.

The operation then proceeds, in a repeated cycle, with the channel liner being advanced the length of one punch section before each downward stroke of the ram 2. When the end plate 8 becomes aligned with the end of the punch section 33, then that punch section is removed before the punch is brought down on its next stroke. After each subsequent compressing stroke of the ram, one punch section is removed, so that the end plate 8 is never engaged by a punch section.

The stroke of the cylinder 44 is exactly equal to the length of one of the die sections 26 to 33 which is the same as the distance between the faces of the ratchet teeth 41a on the racks 41. To advance the channel liner, the cylinder 44 is energized with air or hydraulic fluid so as to drive the piston rod 45 to the left as viewed in Fig. 1B. This movement continues until the pawl 47 is moved over one ratchet tooth 41a and drops to the left of it. During this movement, the pawl 49 remains in engagement with the front edge of a ratchet tooth 41a, and the channel liner is advanced. The cylinder 44 is then energized to drive the rod 45 in the reverse direction, but the pawl 47 now remains in engagement with the vertical surface of a tooth 41a, so rod 45 remains stationary, and the cylinder 44 and carriage 43 are moved to the left to bring them back to their normal positions with respect to the piston rod 45. During this movement, pawl 49 moves over a ratchet tooth 41a and engages the vertical face of the next succeeding tooth.

Before each advancing movement of the channel liner, the cylinders 19 are actuated to raise the wedge plates 13 and thereby to release the side plates 5 and 6 so that they no longer are tightly held in engagement with the charge of material and with the wedge plates 12. The channel liner is then free to move longitudinally with the ram 2. After each advancing movement of the channel linner is completed, the wedges 13 are again moved to their wedging positions and the ram may then be brought down to compress the charge.

Figure 4:
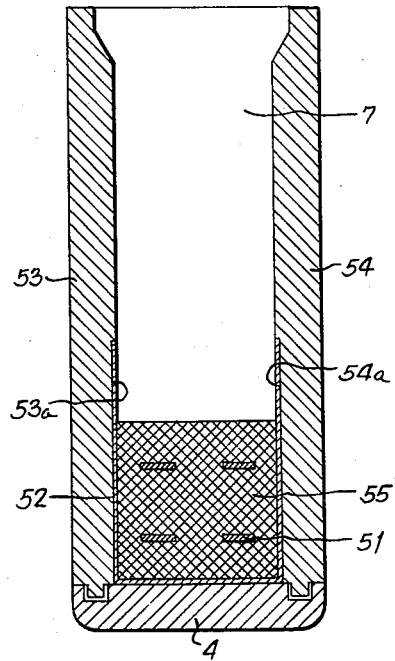
Fig. 4 is a fragmentary cross-sectional view showing a modified form of channel liner apparatus, taken on a line similar to line IV—IV of Fig. 1A.
Figure 5:
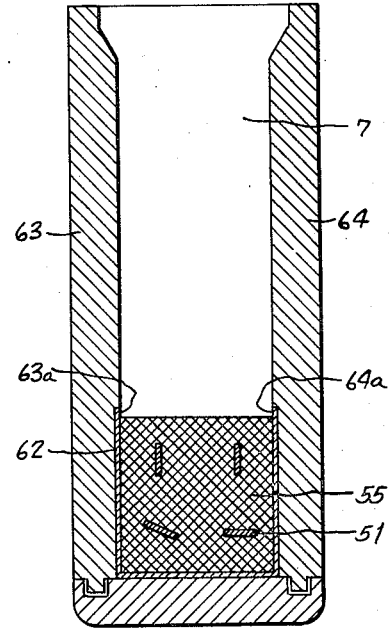
Fig. 5 is a cross-sectional view similar to Fig. 4, showing another modified form of channel liner apparatus.

It is possible, although not presently preferred, to use an auxiliary liner or wrapper 52, two forms of which are illustrated in Figs. 4 and 5. The auxiliary liner is a metal sheet, preferably of the same metal whose sponge is being compressed. When such a liner is used, the side plates 5 and 6 of Figs. 1 to 3 are replaced by side plates 53 and 54 (Fig. 4) having recesses 53a and 54a to receive the sides of the auxiliary liner 42 smoothly. The recesses 53a and 54a, or one of them, may be extended vertically above the upper surface of the finished billet 55 as shown in Fig. 4, and the liner 52 extended vertically to provide a vertically projecting side flap or flaps which may be bent down over the finished electrode 55, after the compression is complete.

Where an alloy is being made, the liner 52 (and the reinforcements 51, if used) should preferably be of substantially the same chemical analysis as that alloy. At least, the liner and reinforcements must have a chemical composition such that they will not adversely effect nor contaminate the final ingot. The electrode is then completely wrapped.

Alternatively, the liner may be constructed as shown at 62 in Fig. 5, with corresponding changes in the side plates 63 and 64. This arrangement leaves the upper face of the billet open, since only small marginal portions of the liner are left to be bent over the billet after the compression is complete.

The liners 52 or 62 serve to strengthen the finished billet, and give it a more finished surface which is somewhat easier to handle. They also serve during the making of the billet to keep fine particles of metal out from between the parts of the channel liner and the various wedging mechanisms. The liners do not extend over the ends of the billet, which are thereby more free to expand during compression than are the sides.

There is a slight longitudinal expansion or growth as the compression progresses. In order to accommodate this growth, before the punch section 33 is removed in preparation for the final strokes, the end wedge 21 at the leading end of the channel is removed. If this wedge is not so removed, the electrode may buckle during the last compression strokes.

After the compression of the billet is complete, the bolts 21a are removed and the end wedges 21 lifted out. The bolts 7 may then be removed and the side plates 5 and 6 lifted out. The billet is then free to be removed, after which the flaps of the wrapper are bent down over the billet by suitable mechanism, or by hand tools, and the billet is finished.

The completed billet comprises a matrix of compressed metal particles, reinforced by the ribbons 51 and also by the wrapper 52 or 62. The compression of the billet forms a tight bond between the matrix and the reinforcing elements, making the finished billet a cohesive unit having substantial tensile strength, which will withstand a considerable amount of handling without breakage, and particularly which will not break while it is being consumed in a furnace. Furthermore, the finished billet has a substantially uniform density and attendant uniform electrical conductivity. These properties ensure that the billet melts uniformly in an electric furnace, and promotes the formation of a uniform ingot. This density must be high enough so that the electrode can convey melting current without internal arcing and possible disintegration.

Although an electrode of rectangular cross-section is illustrated, it should be recognized that other sectional shapes may be employed, for example, a semi-cylindrical shape. The billets produced by this compressing process may be welded together to produce an electrode of larger cross-section.

While I have shown and described certain preferred embodiments of my invention, other modifications thereof will readily occur to those skilled in the art, and I therefore intend my invention to be limited only by the appended claims.

I claim:

1. Apparatus for making electrode billets from sponge or finely divided difficultly meltable metallic material, comprising a press including a vertically movable ram, a horizontally movable channel liner for receiving a charge of the material, and a punch carried by the ram and aligned vertically with the channel liner, said punch being shorter than the liner in the direction of advancing movement of the liner and effective upon a downward movement of the ram to engage a portion only of the charge in the liner and compress it, said punch having a plurality of steps in its under surface, said steps having depths sequentially increasing along the path of advancing movement of the liner, all said steps but the last being of substantially equal length in the direction of advancing liner movement, the last step having a length in that direction substantially greater than said equal length, and being effective to prevent upward curling of the billet as it leaves the punch.

2. Apparatus for making electrode billets from sponge or finely divided difficultly meltable metallic material, comprising a press including a vertically movable ram, a horizontally movable channel liner for receiving a charge of the material, and a punch carried by the ram and aligned vertically with the channel liner, said punch being shorter than the liner in the direction of advancing movement of the liner and effective upon a downward movement of the ram to engage a portion only of the charge in the liner and compress it, said liner including means closing the ends of the channel, said punch comprising a plurality of punch sections separately movable to and from active positions wherein they are mounted on the punch to engage the charge in the liner on each stroke of the ram, said sections being movable away from said positions to avoid interference with the end closing means as it passes under the punch.

3. Apparatus for making electrode billets from sponge and fragments of difficultly meltable metallic material, comprising a press including a horizontally extending bed, a ram movable vertically above said bed, a die block mounted on the press bed and having a channel formed in its upper surface, a channel liner supported by the die block within said channel and adapted to receive a charge of said metallic material, said bed, die block and channel liner being horizontally elongated with their long dimensions parallel, means closing the ends of the channel, a punch carried by the ram and aligned with the channel and dimensioned to fit tightly within said liner, said punch being elongated in the direction of the long dimension of the channel liner, but substantially shorter than the channel liner, said punch being effective upon a downward movement of the ram to engage a portion of the charge of material in the liner and compress it, and step-by-step driving means for advancing the liner between the strokes of the punch in fixed equal increments of travel along the channel beneath the punch, so that on successive strokes, the punch engages compressively successive portions of the charge of material, said punch having a plurality of steps in its under surface, each said step having a dimension along the channel equal to a whole multiple of the length of said equal increments, said steps being of sequentially increasing depth along the path of advancing movement of the liner, so that each portion of the charge being compressed is successively engaged by the successive steps of the punch, said punch being constructed in a plurality of sections, each section comprising one of said steps, said sections being removable between strokes of the punch to avoid interference with said channel end closing means as it passes under the punch.

4. Apparatus as defined in claim 3, including an additional punch section having a flat face and equal in depth to the deepest of said plurality of steps and substantially greater in length than one of the increments of travel, said additional punch section being adapted to be added to the ram adjacent to the deepest step of the punch after the second portion of the charge is completely compressed, so that each portion of the charge being compressed, except the first portion, is preceded by a portion which is also compressively engaged by the punch.

5. Apparatus for making electrode billets from sponge and fragments of difficultly meltable metallic material, comprising a press including a horizontally extending bed, a ram movable vertically above said bed, a die block mounted on the press bed and having a channel formed in its upper surface, a channel liner supported by the die block within said channel and adapted to receive a charge of said metallic material, said bed, die block and channel liner being horizontally elongated with their long dimensions parallel, a punch carried by the ram and aligned with the channel and dimensioned to fit tightly within said liner, said punch being elongated in the direction of the long dimension of the channel liner, but substantially shorter than the channel liner, said punch being effective upon a downward movement of the ram to engage a portion of the charge of material in the liner and compress it, and step-by-step driving means for advancing the liner between the strokes of the punch in fixed equal increments of travel along the channel beneath the punch, so that on successive strokes, the punch engages compressively successive portions of the charge of material, said punch having a plurality of steps in its under surface, all said steps except the next to the deepest having flat bottom faces and a dimension along the channel equal to the length of said equal increments, said steps being of sequentially increasing depth along the path of advancing movement of the liner, so that each portion of the charge being compressed is successively engaged by the successive steps of the punch, said next to deepest step being tapered from a depth equal to that of the deepest step to a depth equal to that of the next shallower step.

References Cited in the file of this patent

UNITED STATES PATENTS

| Number | Name | Date |
|---|---|---|
| 338,541 | McIndoe | Mar. 23, 1886 |
| 1,315,859 | Pfanstiehl | Sept. 9, 1919 |
| 1,326,614 | Pfanstiehl | Dec. 30, 1919 |
| 1,423,973 | Stone | July 25, 1922 |
| 1,962,228 | Abramson et al. | June 12, 1934 |
| 2,027,532 | Hardy | Jan. 14, 1936 |
| 2,198,612 | Hardy | Apr. 30, 1940 |
| 2,222,251 | Calkins | Nov. 19, 1940 |
| 2,359,401 | Wulf | Oct. 3, 1944 |
| 2,398,227 | Hubbert | Apr. 9, 1946 |
| 2,449,257 | Tucker | Sept. 14, 1948 |
| 2,784,453 | Hjulian | Mar. 12, 1957 |